Figure 1:
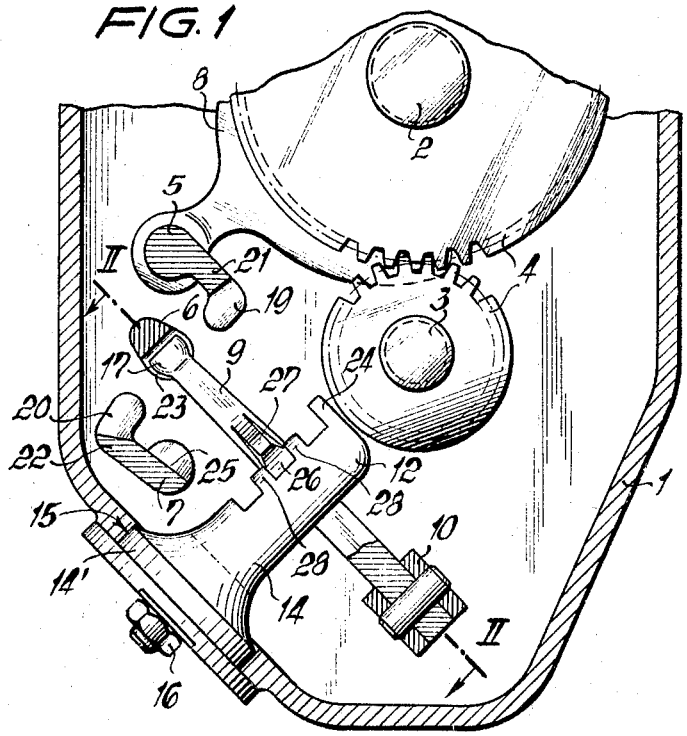

Aug. 2, 1966     R. HETMANN     3,263,518

SHIFTING MECHANISM FOR CHANGE-SPEED TRANSMISSIONS

Filed July 20, 1964

INVENTOR
Richard HETMANN

By Dicke & Craig
ATTORNEY

United States Patent Office 3,263,518
Patented August 2, 1966

3,263,518
SHIFTING MECHANISM FOR CHANGE-SPEED TRANSMISSIONS
Richard Hetmann, Tamm, Germany, assignor to Firma Dr. Ing. h.c. F. Porsche KG, Stuttgart-Zuffenhausen, Germany
Filed July 20, 1964, Ser. No. 383,674
Claims priority, application Germany, Aug. 10, 1963, P 32,374
8 Claims. (Cl. 74—477)

The present invention relates to a shifting mechanism for multi-speed, gear-type change-speed transmissions, especially for motor vehicles, in which the shifting or engagement of the various speeds takes place by means of a shifting finger which cooperates with several shifting rods arranged parallel to one another, of which only one can be displaced at any one time whereas the movement of the remaining shifting rods is blocked by a blocking or locking mechanism that is constituted by a freely projecting U-shaped bow-like member.

It is known, in order to avoid faulty shifting operations in the change-speed transmissions, to provide the shifting linkage with blocking or locking mechanisms which assure that only one of the shifting rods can be moved at any one time in the shifting direction. With one known construction of this type, a shifting shaft carrying the shifting finger of a remote transmission shifting mechanism is provided with a fork-like form piece the projections of which extend into the shifting channel and release at any one time only one shifting rod for the shifting finger. As a result of the combination of the blocking mechanism with the rotatable and displaceable shifting shaft, shifting difficulties arise as an exact adjustment of the blocking device is not possible by reason of the unavoidable play and of the yielding connection in the shifting shaft. Furthermore, it has been proposed in the prior art to provide as locking member a bow-shaped element provided with freely projecting leg portions which extend between the shifting rods or the shifting projections thereof and are provided in the plane of the shifting channel with apertures for the shifting finger of the shifting linkage. Even though this prior art construction entails a considerable simplification, it is disadvantageous in connection therewith that the preselection movement of the shifting finger is limited exclusively by abutments at the shifting projections of the shifting rod. With a lateral pressure on the shifting lever, when for example, the driver leaves the hand on the shifting lever in the neutral or engaged speed position, the shifting finger abuts thereby against the shifting projections and a torque results at the shifting rod, which by way of the shifting fork has to be absorbed by the shifting sleeve. The shifting fork thus frictionally engages strongly against the shifting sleeve so that unpleasant sliding and grinding noises are produced and a high wear occurs.

According to the present invention these disadvantages are avoided in that the shifting finger pivotally supported between the leg portions of the bow-shaped member is provided with nose portions or projections in the shifting direction of the shifting rods which nose portions cooperate with a number of apertures in the leg portions of the bow-shaped member corresponding to the number of shifting rods. By the cooperation of the nose portions of the shifting finger with the apertures the swinging or pivoting movement of the shifting finger in the preselection direction is limited so that with lateral pressure on the shifting lever the shifting finger cannot abut against the shifting projections of the shifting rods. It is avoided thereby with certainty that the shifting rods are twisted or turned. Simultaneously therewith there is prevented by the web portions defining or delimiting the apertures that the shifting operation can be carried out as long as the head portion of the shifting finger rests intermediate apertures or shifting projections of two shifting rods. By reason of the fact that the nose portions of the shifting finger cooperate with apertures in the leg portions which face the shifting rods, as small a distance as possible is realized between the shifting rods or the shifting projections thereof and the locking mechanism. By reason of the fact that the U-shaped bow-like member consists of a die-casting provided with a preferably cylindrical extension which is inserted into an aperture of the transmission housing and is detachably connected therewith, a simple assembly and good securing of the locking mechanism is assured by the present invention.

Accordingly, it is an object of the present invention to provide a shifting mechanism for a multi-speed gearwheel change-speed transmission, especially for motor vehicles which eliminates the aforementioned drawbacks and shortcomings encountered with the prior art constructions by simple and operationally reliable means.

It is another object of the present invention to provide a shifting mechanism for a multi-speed change-speed transmission which eliminates practically completely any faulty shifting operations.

Still another object of the present invention resides in the provision of a shifting mechanism for a multi-speed gear-type change-speed transmission which is extremely reliable in operation notwithstanding the lack of accurate adjustment of the blocking mechanism thereof conditioned by the unavoidable play and elastic connection in the shifting shaft.

Still a further object of the present invention resides in the provision of a shifting mechanism for change-speed transmissions which includes a locking mechanism of such construction that undesirable grinding noises and high wear are avoided in the event of inadvertent lateral pressure on the shifting lever.

Another object of the present invention resides in the provision of a locking device for a shifting mechanism for use in change-speed transmissions which prevents abutment of the shifting finger against the shifting rod with the shifting lever in any position other than the positions permitting engagement of the preselected speed.

A further object of the present invention resides in the provision of a shifting mechanism having a simple yet operational reliable blocking system that may be readily assembled and secured by simple means within the transmission.

Figure 2:
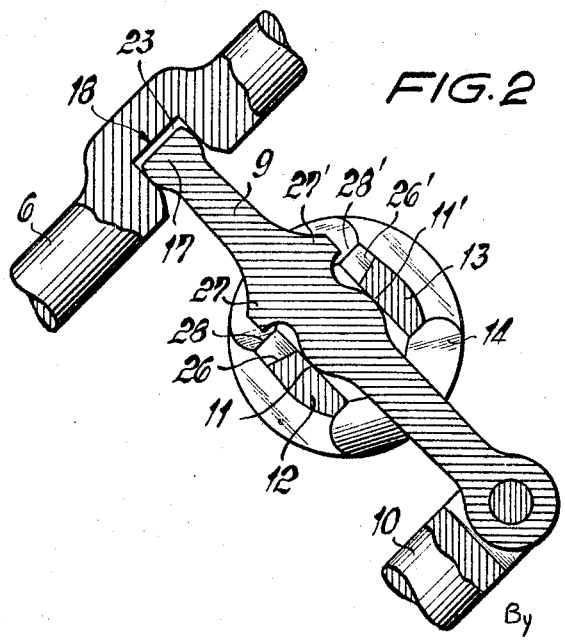

These and other objects, features and advantages of the present invention will become more obvious from the following description when taken in connection with the accompanying drawing which shows for purposes of illustration only, one embodiment in accordance with the present invention, and wherein FIGURE 1 is a partial cross sectional view through a change-speed transmission within the area of the shifting installation thereof in accordance with the present invention, and FIGURE 2 is a cross sectional view, on an enlarged scale, taken along line II—II of FIGURE 1.

Referring now to the drawing wherein like reference numerals are used throughout the two views to designate like parts, reference numeral 1 designates in FIGURE 1 the transmission housing of a change-speed gear within which are supported, in a conventional manner, a transmission drive or input shaft 2 and a transmission output shaft 3. The shifting gear sets 4 (not shown in detail) of a conventional multi-speed change-speed transmission are arranged in the usual manner on these shafts 2 and 3. For purposes of engaging the various speeds or changing the various transmission ratios, shifting rods 5, 6, and 7 are provided which are supported in the end walls (not shown) of the housing 1 and act on the gear sets 4 by way of shifting forks 8. For purposes of displacing the shifting rods 5, 6, and 7 a shifting finger 9 is provided which is pivotally connected with the rotatable and displaceable shifting shaft 10 connected, in turn, with the transmission shifting lever (not shown) of conventional construction. The shifting finger 9 is provided with ball-shaped surfaces 11 and 11' by means of which it is pivotally supported in two mutually perpendicular planes between the leg portions 12 and 13 of a U-shaped, bow-like member 14. The bow-like member 14 possesses a cylindrical extension 14' which is inserted into a bore 15 of the transmission housing 1 and is connected with the housing 1 by means of screws or bolts 16. The head portion 17 of the shifting finger 9 comes to lie in the neutral position of the transmission in a shifting channel generally designated by reference numeral 18. The shifting channel 18 is formed by apertures 19 and 20 in shifting projections 21 and 22 of the shifting rods 5 and 7 matched to head portion 17 of the shifting finger 9 as well as by an aperture 23 in the shifting rod 6. An abutment 24 at the U-shaped bow-like member 14 and an abutment surface 25 at the shifting rod 7 serves for purposes of limiting the preselection movement of the shifting finger 9. For purposes of blocking the shifting rods 5, 6, and 7, a number of apertures 26 and 26' are provided in each of the leg portions 12, 13 of the bow-like member 14 which number corresponds to the number of shifting rods. The shifting finger 9 is provided with nose portions 27 and 27' extending in the shifting direction of the shifting rods which cooperate with the apertures 26 and 26'.

In the neutral position of the transmission illustrated in FIGURES 1 and 2 the head portion 17 of the shifting finger 9 lies in the shifting plane of the shifting rod 6 and is adapted, by rotation of the shifting shaft 10 for the speed selection, to be brought into selective engagement in the shifting channel 18 with the apertures 19 and 20 of the shifting rods 5 and 7. If the head portion 17 of the shifting finger 9, for example, by an incomplete preselection, comes to rest or to a standstill between the apertures 19 and 23 or between the apertures 20 and 23 and if in this position a shifting operation is attempted, regardless of the shifting direction, then the nose portion 27 or 27' abuts against a web portion 28 or 28' of the blocking mechanism defining the apertures so that the change in speed cannot be carried out. The possible movement of two shifting rods in the shifting direction is therewith prevented so that only by complete preselection, that is when the head portions 17 of the shifting finger 9 coincides completely with the corresponding aperture of the shifting rods or the shifting projections of the shifting rod, a shifting is possible. If after completing the change-speed operation the shifting lever is further pressed in the shifting direction, then the shifting finger 9, depending on the shifting direction, abuts with one of its nose portions 27 or 27' in the apertures 26 or 26' whereby no abutment forces are effective at the shifting projections of the shifting rod.

While I have shown and described one embodiment in accordance with the present invention, it is understood that the same is not limited thereto but is susceptible of numerous changes and modifications as known to a person skilled in the art. For example, the nose portions of the shifting fingers may be constituted by the projecting ends of a bolt extending transversely through the shifting finger.

Thus, it is obvious that the present invention is not limited to the details shown and described herein, but is susceptible of numerous changes and modifications, and I therefore do not wish to be limited to the details shown and described herein but intend to cover all such changes and modifications as are encompassed by the scope of the appended claims.

I claim:
1. A shifting arrangement for a multi-speed, gear-type change-speed transmission, especially for motor vehicles, comprising:
   means for selectively engaging the speeds of the change-speed transmission including a plurality of shifting rods arranged substantially parallel to one another and a shifting finger operable to cooperate with said shifting rods for selectively engaging the speeds of the transmission,
   and blocking means to enable displacement of only one shifting rod at any one time while blocking the movement of the remaining shifting rods including substantially U-shaped bow-like means having leg portions, means pivotally supporting said shifting finger between said leg portions, and said shifting finger being provided with nose portions in the shifting direction of the shifting rods, said nose portions cooperating with a number of apertures provided in said leg portions corresponding to the number of shifting rods.
2. A shifting arrangement for a multi-speed, gear-type change-speed transmission, especially for motor vehicles, comprising:
   means for selectively engaging the speeds of the change-speed transmission including a plurality of shifting rods arranged substantially parallel to one another and a shifting finger operable to cooperate with said shifting rods for selectively engaging the speeds of the transmission,
   and blocking means to enable displacement of only one shifting rod at any one time while blocking the movement of the remaining shifting rods including substantially U-shaped bow-like means having leg portions, means pivotally supporting said shifting finger between said leg portions, and said shifting finger being provided with nose portions in the shifting direction of the shifting rods, said nose portions cooperating with a number of apertures provided in said leg portions corresponding to the number of shifting rods and facing said shifting rods.
3. A shifting arrangement for a multi-speed, gear-type change-speed transmission, having a transmission housing, especially for motor vehicles, comprising:
   means for selectively engaging the speeds of the change-speed transmission including a plurality of shifting rods arranged substantially parallel to one another and a shifting finger operable to cooperate with said shifting rods for selectively engaging the speeds of the transmission,
   and blocking means to enable displacement of only one shifting rod at any one time while blocking the movement of the remaining shifting rods including substantially U-shaped bow-like means having leg portions, means pivotally supporting said shifting finger between said leg portions, and said shifting finger being provided with nose portions in the shifting direction of the shifting rods, said nose portions cooperating with a number of apertures provided in said leg portions corresponding to the number of shifting rods,
   said U-shaped bow-like means consisting of a casting having a substantially cylindrical extension,
   said transmission housing being provided with an aperture, said extension being inserted into said aperture, and means for detachably connecting said extension with said transmission housing.
4. A shifting arrangement for a multi-speed, gear-type change-speed transmission, having a transmission housing, especially for motor vehicles, comprising:
   means for selectively engaging the speeds of the change-speed transmission including a plurality of shifting rods arranged substantially parallel to one another and a shifting finger operable to cooperate with said shifting rods for selectively engaging the speeds of the transmission,
   and blocking means to enable displacement of only one shifting rod at any one time while blocking the movement of the remaining shifting rods including substantially U-shaped bow-like means having leg portions, means pivotally supporting said shifting finger between said leg portions, and said shifting finger being provided with nose portions in the shifting direction of the shifting rods, said nose portions cooperating with a number of apertures provided in said leg portions corresponding to the number of shifting rods and facing said shifting rods, said U-shaped bow-like means consisting of a casting having a substantially cylindrical extension, said transmission housing being provided with an aperture, said extension being inserted into said aperture, and means for detachably connecting said extension with said transmission housing.

5. A shifting arrangement for a multi-speed change-speed transmission, especially for motor vehicles, comprising:

means for selectively engaging the various speeds of the change-speed transmission including a plurality of shifting rod means and shifting finger means operable to cooperate with said shifting rod means for selectively engaging the speeds of the transmission, and blocking means to enable displacement of only one shifting rod means at any one time while blocking the movement of the remaining shifting rod means including approximately U-shaped means having leg portions, means for pivotally supporting said shifting finger means between said leg portions, and means formed exclusively by parts of said shifting finger means and said approximately U-shaped means to prevent engagement of said shifting finger means with a shifting rod means except in the proper pre-selected position including further means for preventing engagement between said shifting finger means and said shifting rod means beyond the full engagement of a preselected speed.

6. A shifting arrangement for a change-speed transmission, comprising:

first shifting means actuatable to change the speed of the transmission output, second shifting means actuatable to change the speed of the transmission output, a shifting member, means to selectively give said shifting member a first motion to select either said first shifting means or said second shifting means, and a second pivoting motion to actuate the selected shifting means, control means to block said second motion unless only one of said shifting means has been selected, including a control member stationarily mounted adjacent to said shifting member, and said control member having means to guide said shifting member during said first motion and to act as a fulcrum for said second pivoting motion.

7. A shifting arrangement for a change-speed transmission, comprising:

first shifting means actuatable to change the speed of the transmission output, second shifting means actuatable to change the speed of the transmission output, a shifting member, means to selectively give said shifting member a first motion to select either said first shifting means or said second shifting means, and a second pivoting motion to actuate the selected shifting means, control means to block said second motion unless only one of said shifting means has been selected, including a control member stationarily mounted adjacent to said shifting member, said control member having means to guide said shifting member during said first motion and to act as a fulcrum for said second pivoting motion, and said shifting member and said control member having interengaging means comprising apertures and projections, two of said interengaging means being spaced along said control member to selectively cooperate with the remaining of said interengaging means on said shifting member only when said shifting member has selected one of said shifting means, to allow said second pivoting motion.

8. A shifting arrangement for a change-speed transmission, comprising:

first shifting means actuatable to change the speed of the transmission output, second shifting means actuatable to change the speed of the transmission output, a shifting member, means to selectively give said shifting member a first motion to select either said first shifting means or said second shifting means, and a second pivoting motion to actuate the selected shifting means, control means to block said second motion unless only one of said shifting means has been selected, including a control member stationarily mounted adjacent to said shifting member, said control member having means to guide said shifting member during said first motion and to act as a fulcrum for said second pivoting motion, said shifting member and said control member having interengaging means comprising apertures and projections, two of said interengaging means being spaced along said control member to selectively cooperate with the remaining of said interengaging means on said shifting member only when said shifting member has selected one of said shifting means, to allow said second pivoting motion, and said interengaging means allowing said second pivoting motion only to the extent necessary to actuate the selected shifting means and thereafter blocking said second pivoting motion to avoid unnecessary strain on the selected shifting means.

References Cited by the Examiner

UNITED STATES PATENTS

| 1,564,622 | 12/1925 | Prosser | 74—473 |
| 1,946,750 | 2/1934 | Matthews | 74—473 |
| 2,853,895 | 9/1958 | Bixby | 74—473 |

MILTON KAUFMAN, *Primary Examiner.*

BROUGHTON G. DURHAM, *Examiner.*